United States Patent [19]

Zagar et al.

[11] Patent Number: 4,657,140

[45] Date of Patent: Apr. 14, 1987

[54] FIBER OPTIC CABLE STORAGE DEVICE

[75] Inventors: Gregory J. Zagar, Rome; Thomas A. Ross, Liverpool; Billy C. Lowry, Rome, all of N.Y.

[73] Assignee: The United States of America as represented by the Secretary of the Air Force, Washington, D.C.

[21] Appl. No.: 810,432

[22] Filed: Dec. 18, 1985

[51] Int. Cl.[4] .............................................. B65H 75/14
[52] U.S. Cl. .................................. 206/397; 242/118.4; 242/125.2
[58] Field of Search ............... 206/389, 397, 407, 408, 206/409, 413, 414, 415, 416; 242/118.4, 118.6, 125.1, 125.2; 191/12.4

[56] References Cited

U.S. PATENT DOCUMENTS

| 4,165,876 | 8/1979 | Pasqualini | 273/105.3 |
| 4,190,214 | 2/1980 | Bond | 206/397 |
| 4,193,563 | 3/1980 | Vitale | 242/85 |
| 4,387,863 | 6/1983 | Edmonston et al. | 242/118.4 |
| 4,403,753 | 9/1983 | Gibas et al. | 242/125.2 |
| 4,451,013 | 5/1984 | Bedrosian | 242/118.4 |
| 4,453,635 | 6/1984 | Heinzer et al. | 206/408 |

Primary Examiner—William Price
Assistant Examiner—Jimmy G. Foster
Attorney, Agent, or Firm—Jules J. Morris; Donald J. Singer

[57] ABSTRACT

A fiber optic cable storage device 10 for securing fiber optic cable 36 with connectors 34, 35 on a spool 12. The spool 12 includes a drum 13 with a flange 16 and slot 15 that allows for stress free routing of cable 36 and connectors 34, 35 to a connector storage area 18. The connector storage area includes a drive plate 20 for mechanically reeling of the cable and connector holders 29, 30 for holding fiber optic cable connectors 34, 35. A removable cover 42 is used to trap the cable connectors 34, 35 in the holders 29, 30.

7 Claims, 2 Drawing Figures

FIBER OPTIC CABLE STORAGE DEVICE

STATEMENT OF GOVERNMENT INTEREST

The invention described herein may be manufactured and used by or for the Government for governmental purposes without the payment of any royalty thereon.

FIELD OF THE INVENTION

This invention relates to storage devices for fiber optic cables and is particularly suited for storage of connectorized fiber optic cables.

BACKGROUND OF THE INVENTION

Fiber optic cables are used for transmitting light pulses and have become particularly useful for communications transmission. Fiber optic cables are also increasingly used to replace copper wire in computers and other high speed electronic applications where optical switches (transphasors) are used instead of transistors. This is because light transmits signals faster and more efficiently than electrons in wire.

In most cases fiber optic cables comprise single or multiple flexible light guides. These light guides are capable of transmitting a light impulse from one end of such a cable to its distant end with little distortion or loss of light intensity. This is because fiber optic cables are unaffected by electrical or magnetic interference that degrades electrical signals carried by copper conductors. Further, fiber optic cables are much lighter and much less expensive to manufacture than electrically conductive metal cables. For these reasons fiber optic cables and their associated devices have become much more common in recent years and will continue to grow in use.

As fiber optic systems have developed, fiber optic cables terminated with standard connectors have become more common. These connectors make it possible to join interchangeable fiber optic cables with each other and their associated devices. Typically, these connectors are conical plastic plugs into which the light guide or guides from the cable are embedded in predetermined positions that mate with a receptacle or a second connector.

Some drawbacks to the uniform use of such fiber optic cables with connectors are related to the fragility of the fiber optic cables and the interfaces of connectors with the fiber optic cables. If the fiber optic connectors are allowed to move freely while the fiber optic cable is restrained it is relatively easy to damage the fiber optic cable and cause fractures in the cable which would result in loss of signal. The connectors can also suffer from damage to their optical surfaces if not properly protected.

It is for these reasons that new storage devices have been designed for storing and shipping fiber optic cables complete with their connectors. An example of such a storage device is found in U.S. Pat. No. 4,387,863 to Edmonston et al. The Edmonston patent discloses a spool storage device in which two additional flanges are added to the two standard flanges normally found at spool ends. These additional flanges form channels with the standard flanges that act as seats for the connectorized ends of the fiber optic cable. The channels communicate with the surface of the spool hub via grooves in the standard flanges. In this manner the connectors can be wedged in the channels and restrained from movement. The Edmonston device is an improvement over the state of the art in which connectors had to be manually tied down on the spools to prevent their movement and possible damage to the cable.

The Edmonston device does not, however, completely solve the problems inherent in storing fiber optic cable. The channels provided on each end of the Edmonston spool only allow wedging of the cable connectors. Rotation of circular spools may free the connectors due to their inertia and centrifugal acceleration. Merely wedging the connectors therefore does not positively lock the fiber optic cable and connectors in place. While Edmonston's use of a groove, to prevent bending of the cable during the stowing of the cable ends, is an improvement over the prior art, the channels into which the connectors are wedged do not protect the connector ends from dirt and debris that might damage the optical surfaces on the connector end.

In view of the above it is an object of the present invention to provide an improved fiber optic cable storage device that protects connectors and the fiber optic cables from damage, provides for easy stowing of the fiber optic cables and is relatively inexpensive to produce.

SUMMARY OF THE INVENTION

The invention comprises a fiber optic cable storage device in which a cylindrical spool, has flanges extending at each end. One of the flanges is equiped with a slot that allows passage of a fiber optic cable therethrough when cable is wrapped on a central drum portion of the spool. Fiber optic cable connector holders are preferably mounted to the slotted end of the spool for receiving the connectorized ends of said fiber optic cable.

In the preferred embodiment of the invention an end cover is provided for attachment to the end of the spool upon which are mounted the connector holders. The end cover attaches directly to the connector holders and traps the fiber optic connector ends in position in the connector holders. In addition, the end cover protects the connectors from exposure to the environment.

In the preferred embodiment of the invention a drive plate is provided between the connector holders and the spool. The drive plate is a flat circular plate centrally mounted to an end flange of the spool which has a centrally located receptacle for attachment of a spool reeling device.

In a further aspect of the preferred embodiment the slot on the end flange of the spool extends radially from the outer diameter of the drum portion to the outer diameter of the flange. At each extremity of the slot is a semi-annular notch which provides for passage of the fiber optic cable through the flange without sharp bends or kinks.

BRIEF DESCRIPTION OF THE DRAWINGS

The foregoing and other objects and advantages of the invention will be apparent from the following more particular description of the preferred embodiment of the invention, as illustrated in the accompanying drawings, in which like reference characters refer to the same parts throughout the different views. The drawings are not necessarily to scale, emphasis instead being placed upon illustrating the principles of the invention.

DETAILED DESCRIPTION OF THE INVENTION

Figure 1:
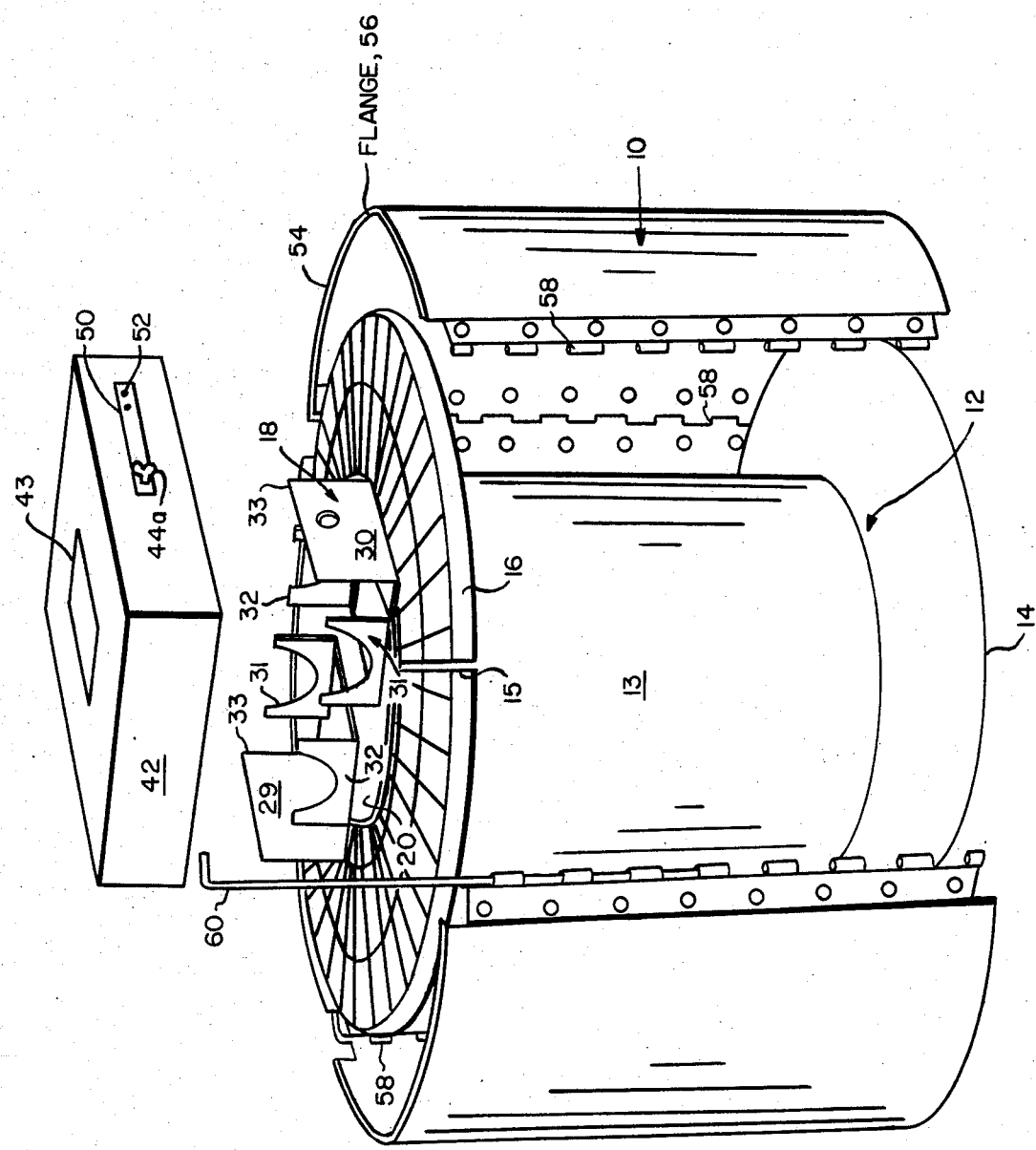
FIG. 1 is a perspective view of a disassembled fiber optic cable storage device.
Figure 2:
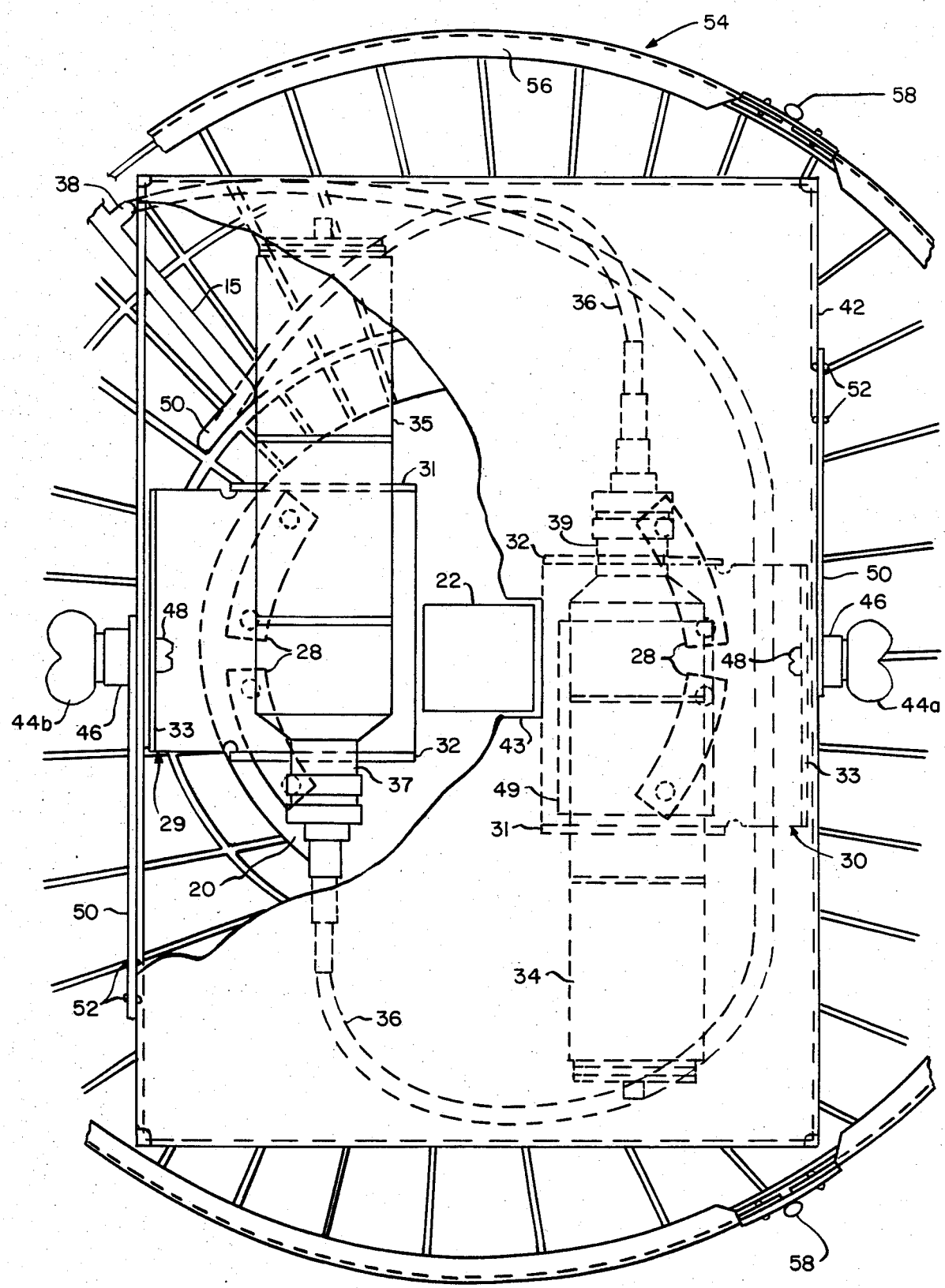
FIG. 2 is a partially segmented top view of the fiber optic cable storage device of FIG. 1 in which a fiber optic cable has been stored in the device.

The device 10 shown in FIGS. 1 and 2 permits easy storage of fiber optic cables upon which connectors have already been installed. The device as shown in FIG. 1, can be manufactured as shown or in some instances a preexisting storage spool can be modified to include the novel features of the storage device.

The basic structure of the fiber optic cable storage device 10 consists of a conventional spool 12 which can be made of either lightweight metals such as cast aluminum or can be injected molded out of a plastic such as polystyrene. The spool 12 can have any of a great variety of drum 13 diameters which are suitable for a variety of cables of varying length and diameter. In the view in FIG. 1 a base flange 14 and an upper flange 16 are positioned at each end of the drum 13. The upper flange 16 includes a fiber optic cable connector storage area 18 which is shown in detail in the view of FIG. 2.

The fiber optic cable connector storage area 18 is seated on a drive plate 20. This drive plate includes a square center hole 22 that forms a receptacle for an automatic cable reeling device. The center hole, or notch, 22 can be made in a variety of different shapes so that it can register with any preferred driving means. The drive plate is held to flange 16 by screws 24 which go through the plate and into tapped holes 26 in backup plates 28. There are four backup plates spaced on the inside of flange 16 to provide for solid attachment of the drive plate 20 thereto. The screws 26 also pass through and attach connector holders 29, 30 to the spool.

The connector holders 29, 30 each have three screw holes which register with the drive plate 20 and the backup plates 28 and accurately position the connector holders adjacent to the drive receptacle 22 of the drive plate 20. Each of the connector holders 29, 30 is slightly offset from the centerlines of the drive plate (as defined by receptacle 22) in order to prevent the fiber optic cable connectors and their attached cable from crossing the hole or each other.

As can be seen most easily in FIG. 1 the connector holders 29, 30 comprise two connector holding cradles 31, 32 and a cover mating flange 33. The cradles 31, 32 are designed to provide resting areas for fiber optic connectors 34, 35 which are received as shown in the top view of FIG. 2. Connector cradles 31 have large circular cutouts in order to accommodate the larger diameter sections of the connectors. Cradles 32 have smaller circular cutouts to accept small connector segments 37, 39 and lock the connectors 34, 35 into position axially.

The fiber optic cable 36 which extends from the connector 34 is looped around in an easy curve into the slot 15. Cable connector 34 is positioned to offer a direct route of the cable into an inner semi-annular groove 40 of the slot 15. Typically connector 34 will be placed in its holder 30 first and then the fiber optic cable will be looped through semi-annular groove 40 and onto the spool. After that has been done the cable is wrapped around the spool as many times as necessary either by hand or mechanically until a half a loop or greater of cable remains with connector 35. Since connector 35 preferably faces opposite connector 34 at least a half a loop of cable 36 is required for placement of connector end 35 in connector holder 29. Cable is then threaded through outermost semi-annular groove 38 and around and beneath connector 34 as connector 35 is placed in its holder 31. In this way both connectors 34, 35 can be placed in their holders 29, 30 without the fiber optic cable 36 tangling or being subjected to stressful bending.

After the cable has been completely stored upon the spool a cover 42 is placed over the connectors and connector holders. Cover keys 44A and 44B are then inserted into keyholes 46 in the cover 42 and locks 48 in the cover flanges 33 of the holders 29, 30. The keys are then turned to secure the cover over the connector holders. The covers have positioned over the connector holders 29, 30 foam rubber cushions 48 which cushion the connectors against vibration during their time in storage as well as trap the connectors in the connector holders 29, 30. The keys 44A and 44B are held to the end covers by ejector springs of spring metal 50 which are attached by rivets 52 to the end cover 42. The cover 42 also comprises a cutout 43 that gives access to the drive plate center hole 22.

If further cable storage protection is required once the fiber optic cable and connectors are properly stored upon the storage device 10, a spool cover 54 is placed around the spool. The spool cover 54 has flanges 56 which mate with the spool flanges 14 and 16 by overlapping them, to prevent relative axial movement of the spool cover 54. The spool cover is provided with three hinges 58 one of which has a removable hinge pivot 60. Once the spool cover is placed around the spool hinge pivot 60 is placed in the hinge to hold the hinge cover in position.

The assembled device therefore completely protects the fiber optic cable 36 and connectors 34 from any possible damage during storage and transport. The connectors are maintained in the holders and elastically supported so as to minimize vibration damage. In stowing cables and connectors upon the storage device it has been shown that sharp ends and kinks are avoided so that the possibility of cable breakage due to bending stress is reduced. Cables are easily stowed by the procedure discussed above and the drive receptacle provided allows mechanized stowing of long cables.

This storage device provides a straightforward yet effective means of protecting stored cables and allowing for their easy transport. Further, only a few uncomplicated parts are required to convert a conventional spool to the storage device of FIG. 1. This allows inexpensive manufacture of the fiber optic cable storage device.

While the invention has been particularly described with reference to the preferred embodiment thereof, it will be understood by those skilled in the art that various changes in substance and form can be made therein without having departed from the spirit and the scope of the invention as detailed in the attached claims.

I claim:
1. A fiber optic cable storage device comprising:
   (a) a storage spool comprising:
      (i) a cylindrical drum; and
      (ii) flanges extending at each end of said drum wherein one of said flanges has a slot to allow the passage of fiber optic cable therethrough;
   (b) a drive plate centrally mounted to one end of said drum and having a center hole for attachment to a reeling device;

(c) at least one fiber optic cable connector holder mounted on an end of said drum for receiving a connectorized end of said fiber optic cable; and (d) means for attachment to an end of said drum comprising an end cover which, when attached, traps said connectorized end of the fiber optic cable in said connector holder and in conjunction with said connector holder protects said connectorized end of said fiber optic cable from damage.

2. The fiber optic cable storage device of claim 1 wherein two connector holders are positioned on an end of said drum.

3. The fiber optic cable storage device of claim 1 wherein said end cover fixedly attaches to said connector holders.

4. The fiber optic cable storage device of claim 1 further comprising an open ended cylindrical spool cover that attaches to surround said cylindrical drum.

5. The fiber optic cable storage device of claim 1 wherein said end cover further comprises foam pads to trap and cushion said connectorized ends of the fiber optic cable.

6. The fiber optic cable storage device of claim 1 wherein said slot extends from the outer edge of said cylindrical drum to the outermost portion of said flange and has semi-annular notches at its innermost and outermost extremities.

7. A fiber optic cable storage device comprising:
(a) a storage spool comprising:
  (i) a cylindrical drum; and
  (ii) flanges extending at each end of said drum wherein one of said flanges has a slot to allow the passage of fiber optic cable therethrough;
(b) at least one fiber optic cable connector holder mounted on an end of said drum for receiving a connectorized end of said fiber optic cable; and
(c) means for attachment to an end of said drum comprising an end cover which, when attached, traps said connectorized end of the fiber optic cable in said connector holder and in conjunction with said connector holder protects said connectorized end of said fiber optic cable from damage.

* * * * *